US011153353B1

(12) United States Patent
Padhye et al.

(10) Patent No.: US 11,153,353 B1
(45) Date of Patent: Oct. 19, 2021

(54) FAR END AUDIO MODE DETECTION

(71) Applicant: Avaya Management L.P., Santa Clara, CA (US)

(72) Inventors: Anand Padhye, Pune (IN); Tatya Kadam, Pune (IN)

(73) Assignee: Avaya Management L.P., Santa Clara, CA (US)

( * ) Notice: Subject to any disclaimer, the term of this patent is extended or adjusted under 35 U.S.C. 154(b) by 0 days.

(21) Appl. No.: 16/878,369

(22) Filed: May 19, 2020

(51) Int. Cl.
*H04L 29/06* (2006.01)

(52) U.S. Cl.
CPC ...... *H04L 65/1083* (2013.01); *H04L 65/1069* (2013.01); *H04L 65/1096* (2013.01); *H04L 65/403* (2013.01)

(58) Field of Classification Search
None
See application file for complete search history.

(56) References Cited

U.S. PATENT DOCUMENTS

| | | | | |
|---|---|---|---|---|
| 2004/0258050 A1* | 12/2004 | Sylvain | ............... | H04L 12/6418 370/352 |
| 2006/0067302 A1* | 3/2006 | Wengrovitz | ........ | H04M 1/2535 370/352 |
| 2006/0239247 A1* | 10/2006 | Postmus | ........... | H04L 29/06027 370/352 |
| 2011/0255446 A1* | 10/2011 | Potts | .................. | H04L 65/1096 370/260 |
| 2015/0156702 A1* | 6/2015 | Stojanovski | ........ | H04L 41/0836 370/328 |
| 2015/0256628 A1* | 9/2015 | Pattan | ................. | G06F 3/04842 715/752 |
| 2016/0080021 A1* | 3/2016 | Olson | ................. | H04B 1/3877 455/552.1 |
| 2017/0054755 A1* | 2/2017 | Mendiratta | ......... | H04L 63/1441 |
| 2017/0318456 A1* | 11/2017 | Vari | .................. | H04M 1/72519 |

OTHER PUBLICATIONS

Rosenberg et al. "SIP: Session Initiation Protocol," The Internet Society, Jun. 2002, RFC 3261, 252 pages.

\* cited by examiner

*Primary Examiner* — Joshua Joo
(74) *Attorney, Agent, or Firm* — Sheridan Ross P.C.

(57) ABSTRACT

Privacy is often a concern when conducting a voice-based communication over a network. Users who utilize a speakerphone may provide an opportunity for unwelcome third parties to overhear the far-end portion of the call. By establishing a Session Initiation Protocol (SIP) media session utilizing signaling comprising a transducer header, a called device may utilize the desired transducer to better facilitate privacy (e.g., headset, handset). If privacy is not requested, the transducer header may indicate any transducer may be used or that use of a speakerphone is permitted. Mid-call changes in the requested privacy may also be accommodated to request transition to or from a more private transducer utilized by the far-end device.

20 Claims, 9 Drawing Sheets

FAR END AUDIO MODE DETECTION

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for determining and enabling secure communications and particularly to determining the far-end use of an insecure communication component.

BACKGROUND

If a user (Caller) calls another user (Callee) and intends to have conversation on a sensitive topic, Caller may want to ensure that Callee uses headset or handset and not a speakerphone, which may cause the both sides of the conversation to be overheard by unintended parties. As of now, Caller would need to ask Callee if he/she is on speakerphone and if so, switch to handset/headset. If Callee claims to have switched from a speakerphone to their handset/headset, Caller has no way to verify if this is true.

Calls may be packet-switched for transport via a digital network, such as the Internet. Session Initiation Protocol is one means by which such calls are created and conducted. More specifically, a signaling channel is established for the exchange of messages between endpoints while the actual content of the communication (e.g., encoded voice signals) are exchanged, such as by a real-time protocol, on a media channel.

One known standard for packet-switched calls is provided by the series of Session Initiation Protocol (SIP) standards, which are rooted in the, "Request for Comments: 3261," of the Network Working Group 2002 and available at https://tools.ietf.org/html/rfc3261. Subsequent to RFC 3261, additional, alternative, and updated features and their associated standards have previously been published by the Network Working Group, et al.

The SIP standards are herein incorporated by reference.

SUMMARY

These and other needs are addressed by the various embodiments and configurations of the present invention. The present invention can provide a number of advantages depending on the particular configuration. These and other advantages will be apparent from the disclosure of the invention(s) contained herein.

When Caller calls Callee, and Callee answers, Callee's active transducer (e.g., headset, handset, speaker, etc.) will notify Caller, via a top-line message or a pop-up presented on their calling device. Caller can continue as normal and whenever Caller needs to bring up a private or sensitive topic, Caller can press a key/button, such as labeled "Private". Caller's audio may be automatically muted and Callee will be notified via a message on top-line or via a pop-up such by prompting, "Privacy requested, please switch to headset/headset." When Callee presses their headset button or otherwise causes their communication device to go off-hook, via handset or headset, Caller will be notified and, if previously muted, automatically unmuted. Caller and Callee may then resume their conversation with the Callee's speakerphone excluded and thereby avoid a bystander or eavesdropper hearing Caller's portion of the conversation.

In one embodiment, Caller's communication device sends a Privacy request in a SIP proprietary header, for example "Transducer: <local=private; remoteRequested=private> in the INVITE message. The use of "local" field indicates the transducer that is in-use on the Caller's device or "near end" and "remoteRequested" indicates the transducer that the Callee's device, or "far end" must use. The values for the fields can be "private" which indicates handset/headset are to be used, but at least a speakerphone feature or device not be used, or "SpeakerPhone" to indicate that a speakerphone device or feature may be utilized. It should be appreciated that "SpeakerPhone" permits the use of a speakerphone but does not exclude the use of headset/handset.

In another embodiment Callee's device will reply to the INVITE and send the chosen active transducer in the header of the 200 OK message, such as "Transducer: <local=private>". In another embodiment, such as when the call has already been established and in a normal (no privacy requested) mode and privacy is then requested mid-call. Caller's device will send an INFO message with privacy request in the headers, such as "Transducer: <local=private; remoteRequested=private>", such as when "private" is to limit the transducer to handsets and headsets. When Callee switches transducers mid-call, it will send 200 OK message with the active transducer name in SIP header Transducer, such as "<local=private>".

In one embodiment, a system for communicating via a network is disclosed, comprising: a processor; a communication interface to the network; and a user interface; and wherein the process performs: upon receiving a signal from the user interface associated with placing a call, formatting a Session Initiation Protocol (SIP) INVITE message, wherein the INVITE message comprises a SIP header which further comprises a transducer header field for the far-end device; initiating a media session with the far-end device comprising sending, via the communication interface, the INVITE message to the far-end device; in response to the sending of the INVITE message, receiving a first reply comprising the current transducer of the far-end device; and presenting, on the user interface, indicia of the current transducer of the far-end device.

In another embodiment, a system for communicating via a network is disclosed, comprising: a processor; a communication interface to the network; and a user interface; and wherein the process performs: conducting a Session Initiation Protocol media session with a far-end device, via the communication interface; upon receiving a signal from the user interface associated with placing a call, formatting a Session Initiation Protocol (SIP) INFO message, wherein the INFO message comprises a SIP header which further comprises a transducer header field for the far-end device; sending the INFO message, via a SIP signaling channel, to the far-end device; in response to the sending of the INFO message, receiving a first reply comprising the current transducer of the far-end device; and presenting, on the user interface, indicia of the current transducer of the far-end device.

In another embodiment, a system for communicating via a network is disclosed, comprising: a processor; a communication interface to the network; a user interface; and at least one audio input device; and wherein the process performs: receiving, via the communication interface, a Session Initiation Protocol (SIP) INVITE message from a far-end device, wherein the INVITE message comprises a SIP header which further comprises a transducer header field; in response to receiving the INVITE message, presenting a call request on the user interface comprising indicia of the transducer header field; in response to presenting the call request, receiving an off-hook signal from the user interface, the off-hook signal comprising indicia of a selected one of the at least one audio input device; and in response to receiving the off-hook signal, formatting a reply message further comprising a transducer header field indicating the active one of the at least one audio input device; sending the reply message; and connecting the far-end device for a media session therebetween.

Aspects of the embodiments include method steps to be performed by one or more processors.

A further aspect of the embodiments includes a method for receiving a signal from the user interface associated with placing a call, formatting a Session Initiation Protocol (SIP) INVITE message, wherein the INVITE message comprises a SIP header which further comprises a transducer header field for the far-end device; initiating a media session with the far-end device comprising sending, via the communication interface, the INVITE message to the far-end device; in response to the sending of the INVITE message, receiving a first reply comprising the current transducer of the far-end device; and presenting, on the user interface, indicia of the current transducer of the far-end device.

A further aspect of the embodiments includes a method for conducting a Session Initiation Protocol media session with a far-end device, via the communication interface; upon receiving a signal from the user interface associated with placing a call, formatting a Session Initiation Protocol (SIP) INFO message, wherein the INFO message comprises a SIP header which further comprises a transducer header field for the far-end device; sending the INFO message, via a SIP signaling channel, to the far-end device; in response to the sending of the INFO message, receiving a first reply comprising the current transducer of the far-end device; and presenting, on the user interface, indicia of the current transducer of the far-end device.

A further aspect of the embodiments includes a method of receiving, via the communication interface, a Session Initiation Protocol (SIP) INVITE message from a far-end device, wherein the INVITE message comprises a SIP header which further comprises a transducer header field; in response to receiving the INVITE message, presenting a call request on the user interface comprising indicia of the transducer header field; in response to presenting the call request, receiving an off-hook signal from the user interface, the off-hook signal comprising indicia of a selected one of the at least one audio input device; and in response to receiving the off-hook signal, formatting a reply message further comprising a transducer header field indicating the active one of the at least one audio input device; sending the reply message; and connecting the far-end device for a media session therebetween.

Aspects of the embodiments include an audio input component; and wherein the processor further performs: formatting the SIP INVITE message comprising the transducer header field for the far-end device further having a value associated with use of a headset and/or handset; and upon the first reply comprising the current transducer having a value associated with use of a speakerphone, automatically muting the audio input component.

Aspects of the embodiments include, wherein the processor further performs: formatting the SIP INVITE message comprising the transducer header field for the far-end device further having a value associated with use of a headset and/or handset; and upon the first reply comprising the current transducer having a value associated with use of a speakerphone, the processor presents the indicia of the current transducer of the far-end device indicating an absence of privacy.

Aspects of the embodiments include at least one audio input device, wherein one of the at least one audio input device is active; and wherein the processor formats the SIP INVITE message further comprising a transducer header field indicating the active one of the at least one audio input device.

Aspects of the embodiments include wherein the transducer header field for the far-end device comprises indicia indicating one of privacy or non-privacy.

Aspects of the embodiments include, wherein the indicia indicating non-privacy further indicates "speakerphone."

Aspects of the embodiments include, wherein the indicia indicating privacy further indicates at least one of "headset" or "handset."

Aspects of the embodiments include, wherein the processor further performs: conducting a media session with the far-end device; while the media session is underway, receiving a second reply comprising an updated current transducer of the far-end device; and presenting, on the user interface, indicia of the updated current transducer of the far-end device.

Aspects of the embodiments include an audio input component; and wherein the processor further performs, automatically muting the audio input component, upon determining the second reply comprising the updated current transducer having a value associated with use of a speakerphone.

Aspects of the embodiments include an audio output component; and wherein the processor further performs, automatically energizing an alerting audio signal presented by the audio output component, upon determining the second reply comprising the updated current transducer having a value associated with use of a speakerphone.

Aspects of the embodiments include, wherein the processor, in response to the sending of the INVITE message, further performs: waiting to receive the first reply comprising the current transducer of the far-end device; and while waiting, presenting, on the user interface, indicia of an unknown current transducer of the far-end device.

Aspects of the embodiments include, wherein the processor, at a time subsequent to receiving the first reply, receives a second reply comprising the now current transducer of the far-end device.

Aspects of the embodiments include an audio input component; and wherein the processor further performs: formatting the SIP INFO message comprising the transducer header field for the far-end device further having a value associated with use of a headset and/or handset; and upon the first reply comprising the current transducer having a value associated with use of a speakerphone, automatically muting the audio input component.

Aspects of the embodiments include, wherein the processor further performs: formatting the SIP INFO message comprising the transducer header field for the far-end device further having a value associated with use of a headset and/or handset; and upon the first reply comprising the current transducer having a value associated with use of a speakerphone, automatically unmuting the audio input component.

Aspects of the embodiments include, wherein the reply message comprises a portion of one of a SIP 200 OK message or a SIP INFO message.

Aspects of the embodiments include, wherein the INVITE message further comprises a SIP header which further comprises a transducer header field for the far-end device and, in response, the processor causes a call presence with the far-end device to be presented, the presentation of which comprises indicia of the transducer header field for the far-end device.

Aspects of the embodiments include, wherein the processor further performs: conducting a media session with the far-end device; while the media session is underway, receiving a second reply comprising an updated current transducer of the far-end device; and presenting, on the user interface, indicia of the updated current transducer of the far-end device.

Aspects of the embodiments include, wherein the processor performs: upon connecting the far-end device for the media session, receives a first SIP INFO message comprising a transducer header having an indicia of a request for privacy; in response to receiving the SIP INFO message, causes the user interface to present a prompt to perform at least one of discontinue the use of a speakerphone, utilize a headset, or utilize a handset; and upon receiving a signal from the user interface indicating the one of discontinue the use of the speakerphone, utilize the headset, or utilize the handset, formulating a second SIP INFO message comprising indicia of the one of discontinue the use of a speakerphone, use of the headset, or use of the handset.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
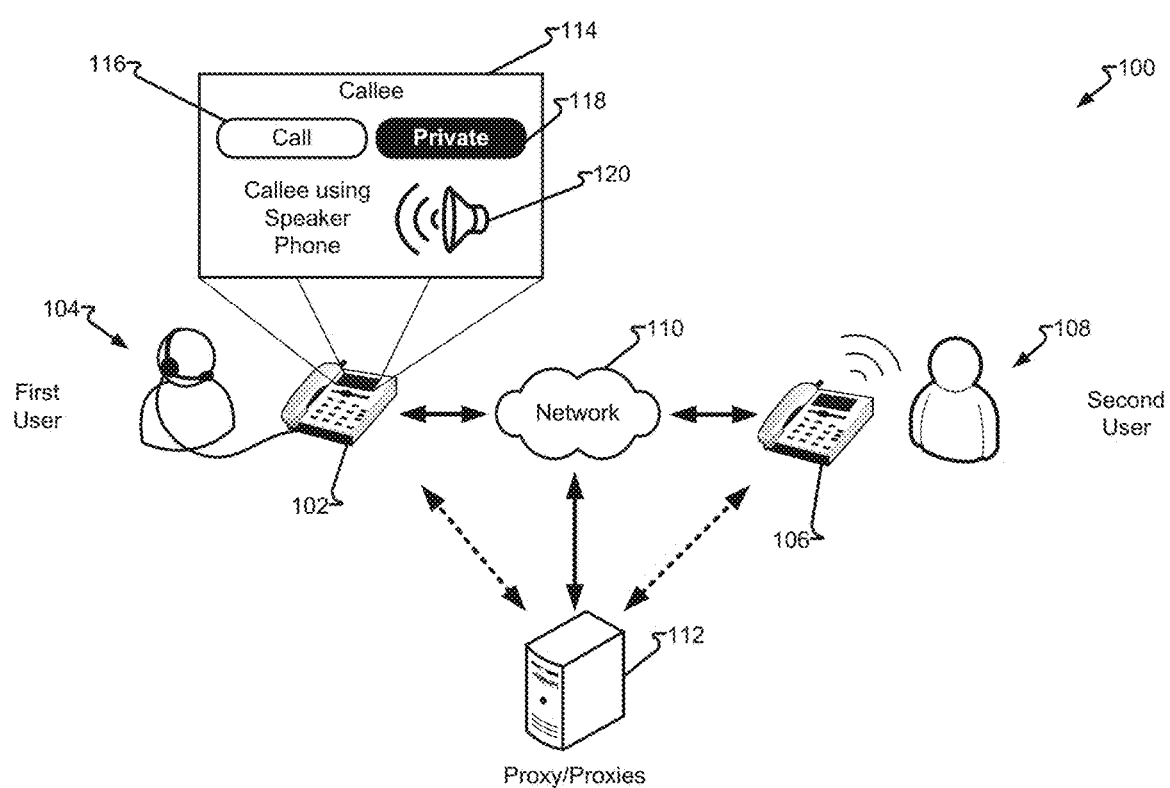
FIG. 1 depicts a first system in accordance with embodiments of the present disclosure.

FIG. 1 depicts system 100 in accordance with embodiments of the present disclosure. First endpoint 102 and second endpoint 106 are each electronic devices operable to facilitate communication between first user 104 and second user 108, respectively, over network 110. While first endpoint 102 and second endpoint 106 are illustrated as voice only telephones, it should be appreciated that other devices may be utilized, including but not limited to, cellular telephones, a computing device comprising a processor configured to execute a communication program (e.g., soft phone), etc. A call, such as an audio-only call, is placed from one endpoint to the other, for example, first user 104 originating a call to second endpoint 106. A call may also be embodied as an audio-video call or other form of call (e.g., co-browsing session) wherein at least an audio portion is provided to convey encoded audio signals between the participants of the call. First endpoint 102 and second endpoint 106 each comprise an audio output device or component associated therewith, such as a headset, handset, speaker phone. An integrated device (e.g., cellular telephone) may have an integrated speaker or a Bluetooth or wired earphone, headphone, or other output device. Similarly, each of first endpoint 102 and second endpoint 106 comprise an audio input device (e.g., microphone) which may be integrated into the device itself (build in microphone), integrated into a component (headset/handset microphone), or other component or device wherein sound waves, such as those created from the speech of first user 104 and/or second user 108 may be converted into electrical signals for further conversion into packets for transport via network 110.

In one embodiment, first user 104 initiates a call to second user 108. First user 104 is planning on discussing a topic that he/she does not wish to be overheard, such as by another person who would be able to overhear first user 104 speaking as presented on second endpoint 106 when second endpoint 106 is utilizing a speakerphone feature or associated speakerphone device. Accordingly, first user 104 would like to have second user 108 conduct the call, or at least a portion thereof, using a transducer that would enable second user 108 to hear the speech of first user 104, as decoded by second endpoint 106. As a result, the transducer desired may be a headset or a handset, or other transducer that would allow second user 108 to receive the audio portion but excludes the speakerphone or other transducer that emits sound in a manner that would readily enable another party to hear the speech presented by second endpoint 106.

As used herein, a headset or handset is an audio output device or component generating sound waves from encoded signals received via network 110 for the private listening of a user. While another person may be able to hear the output from a headset or handset, such as by being in very close proximity to the participating user (e.g., a few inches, within arm's length in a quite room), such a person would be required to be in such a close proximity that they could not hear the output without the intended audience being aware of the other person's presence. Accordingly, as used herein a transducer, embodied as a headset or handset or similar personal listening device, is a device for the presentation of sound solely to the intended user.

In contrast, as used herein, a speakerphone is an audio output device or component generating sound waves from encoded signals received via network 110 for the listening of one or more users. The output of a speakerphone may be heard by others, such as during a conference call, when it is desired to have a plurality of users hear the output. However, a speakerphone broadcasts sound in a manner that enables persons in an extended area from the speakerphone to be able to hear the output. This extended proximity may enable persons to hear the output of the speakerphone without the intended participant being aware of their presence, such as an inadvertent bystander or a deliberate eavesdropper. Accordingly, as used herein, a transducer, embodied as a speakerphone or other sound broadcasting device, is a device for the presentation of sound to all participants within an extended range that includes at least one other unintended listener, whether or not such an unintended listener(s) is (are) actual present. The unintended listener(s) would be excluded from hearing the audio presented if a headset or handset were utilized by the intended participant in place of the speakerphone. In one embodiment, the intended participant is second user 108. In another embodiment, the intended participant is first user 104. In yet another embodiment, both first user 104 and second user 108 are each intended participants.

When initiating the call, first user 104 is presented with user interface 114 on first endpoint 102 and the option to select call button 116 or private mode button 118. When not currently engaged on a call, call button 116 and private mode button 118 may each initiate a call. When already engaged on a call, call button 116 and private mode button 118 may be associated with a changing of privacy modes for the currently ongoing call, such as when the text of call button 116 is changed to "remove privacy," "enable far-side speakerphone," or similar wording and/or the text of private mode button 118 is changed to "switch to private mode," or similar wording. It should be appreciated that user interface 114 illustrates one embodiment of a user interface and that other user interfaces may be utilized to initiate, maintain, or switch a call in a non-private mode (e.g., far-side speakerphone permitted, any transducer permitted, etc.) or a private mode (e.g., far-side speakerphone prohibited, headset/handset use required, etc.).

The call may be setup via a SIP proxy server or servers, such as proxy/proxies 112, which may be a single proxy server associated with each of a domain for first endpoint 102 and a domain for second endpoint 106 or a single shared proxy server, such as when both first endpoint 102 and second endpoint 106 are each within the same domain. Proxy/proxies 112 facilitates the setup of the call, such as by finding a specific endpoint called based on caller and/or callee routing rules, call setup and takedown, etc. The media that transports the actual call content (e.g., encoded audio signals) may be transmitted via network 110 in a path that excludes proxy/proxies 112.

If first user 104 has no privacy requirement, call button 116 may be selected to initiate the call in accordance with call initiation as is known in the prior art. By extending the prior art of SIP-based and otherwise advancing the state of the art, a first user 104 may initiate a call with a privacy requirement. Accordingly, first user 104 may select private mode button 118 to initiate the call with a privacy mode request for the far-end device, such as, second endpoint 106. A SIP session may then be setup with appropriate messages to facilitate a privacy mode, which may then prompt or requiring the far-end device to utilize a transducer associated with privacy (e.g., headset/handset) or exclude the use of a transducer not associated with privacy (e.g., speakerphone). An established call may be established in one of private mode or non-private mode and then transition to the other of private mode or non-private mode and, as a further option, back again. Additionally or alternatively, the recipient of the call request, such as second endpoint 106 may request a private mode from the caller, such as first endpoint 102. Accordingly, in another embodiment, any one of first endpoint 102 or second endpoint 106 may request the other endpoint transition the call to (or from) private mode.

In another embodiment, indicia of mode of the far-end device (second endpoint 106) may be presented on user interface 114, such as via text or icon 120.

As described in more detail with respect to FIGS. 2-5, specific SIP and SIP-compliant messages are exchanged between first endpoint 102 and second endpoint 106 for the establishment and/or transitioning of a call to a particular one of a private mode or a non-private mode. FIGS. 2-5 may be embodied as machine-executable instructions embodying an algorithm for the execution by at least one processor of first endpoint 102, second endpoint 106, and/or proxy/proxies 112, as indicated with respect to the formatting/sending or receiving of a particular message. Furthermore, such machine-executable instructions may be maintained as machine-readable instructions in a non-transitory device or devices accessible to the at least one processor of first endpoint 102, second endpoint 106, and/or proxy/proxies 112.

In another embodiment, the messages depicted in FIGS. 2-5 are native SIP messages or SIP compliant messages. More specifically, standard SIP messages (e.g., 100 TRYING, ACK, 180 RINGING, etc.) may be utilized for as well as customizable SIP messages (e.g., INVITE, INFO, 200 OK, etc.) that are provided by the SIP protocol and enabled to include custom fields and values, the specific fields and associated content, as well as their use, are outside the SIP protocol.

Figure 2:
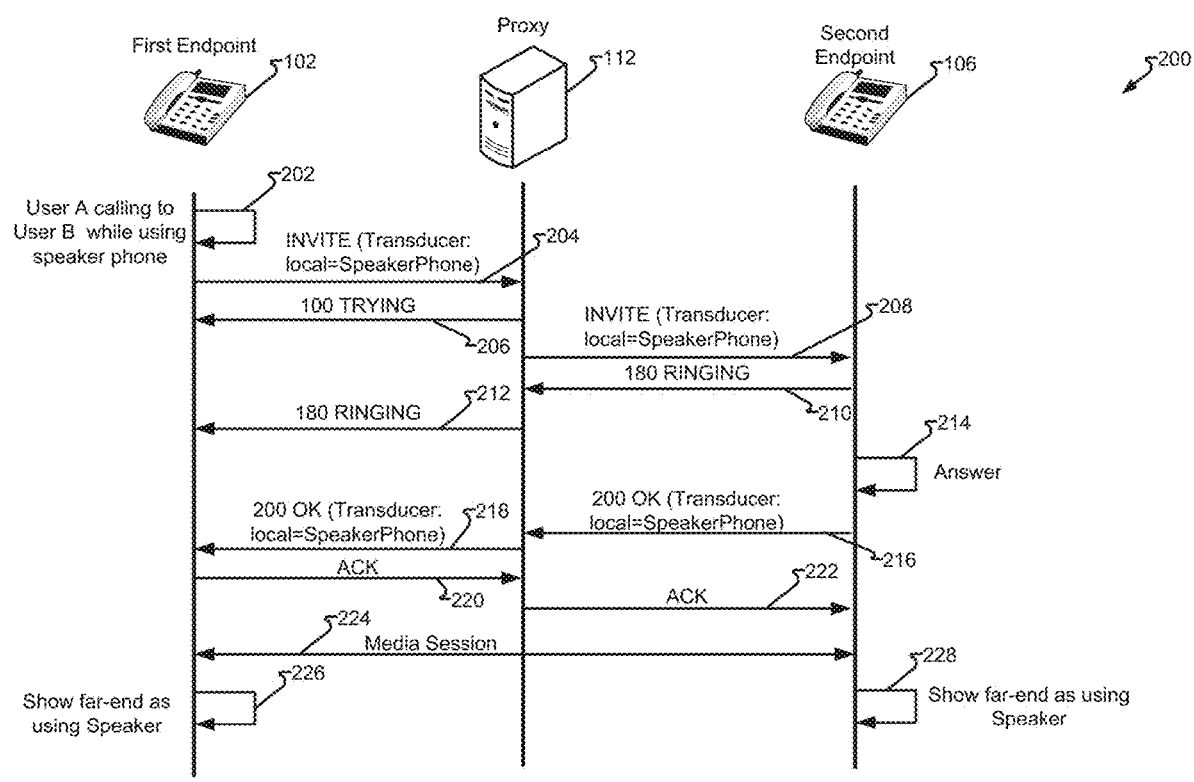
FIG. 2 depicts a first interaction in accordance with embodiments of the present disclosure.

FIG. 2 depicts interaction 200 in accordance with embodiments of the present disclosure. In one embodiment, first user 104 utilizes first endpoint 102 to initiate a call to second endpoint 106 without a privacy mode request. Accordingly, step 202 receives an input, such as to call button 116 associated with the number, name, or other indicia of second user 108 and/or second endpoint 106. Message 204 is formatted and sent as an INVITE message comprising header with a "Transducer" field and having a value of "speakerphone" or other indicia associated with an absence of privacy. Alternative phrasing may be utilized without departing from the scope of the embodiments. For example, "transducer" may be "privacy mode" or other identifier associated with privacy. Similarly, other phrasing for the value of the field "SpeakerPhone" may be used, such as "no-privacy," "non-private," "any transducer," etc. as may be understood by each of first endpoint 102 and second user 108.

The message 204 is received by proxy/proxies 112, which acknowledges with message 206 and sends message 208 to second user 108, which in turn replies with message 210. Receipt of message 210 then triggers message 212 back to first endpoint 102. Second endpoint 106 is then answered in step 214, which then sends message 216 to proxy/proxies 112, and in turn, message 218. Message 216 and message 218 comprise header with a "Transducer" field having a value comprising an indicia of the transducer utilized to answer the call in step 214, in this example, "SpeakerPhone," indicating that the second endpoint 106 went off-hook with a speaker phone.

Messages 220 and 222 are sent from first endpoint 102 to proxy/proxies 112 and then to second endpoint 106 to acknowledge the 200 OK message, whereby first endpoint 102 and second endpoint 106 are then connected, such as via a real-time protocol to exchange media (e.g., encoded audio signals) in media session 224. First endpoint 102 displays the far-end device (second endpoint 106) as being in a non-private mode (e.g., speakerphone) in step 226 and second endpoint 106 displays the far-end device (first endpoint 102) as being in a non-private mode (e.g., speakerphone) in step 228. The call termination may be initiated (not shown), such as by one of first endpoint 102 or second endpoint 106 sending a termination message (e.g., "BYE").

Figure 3A:
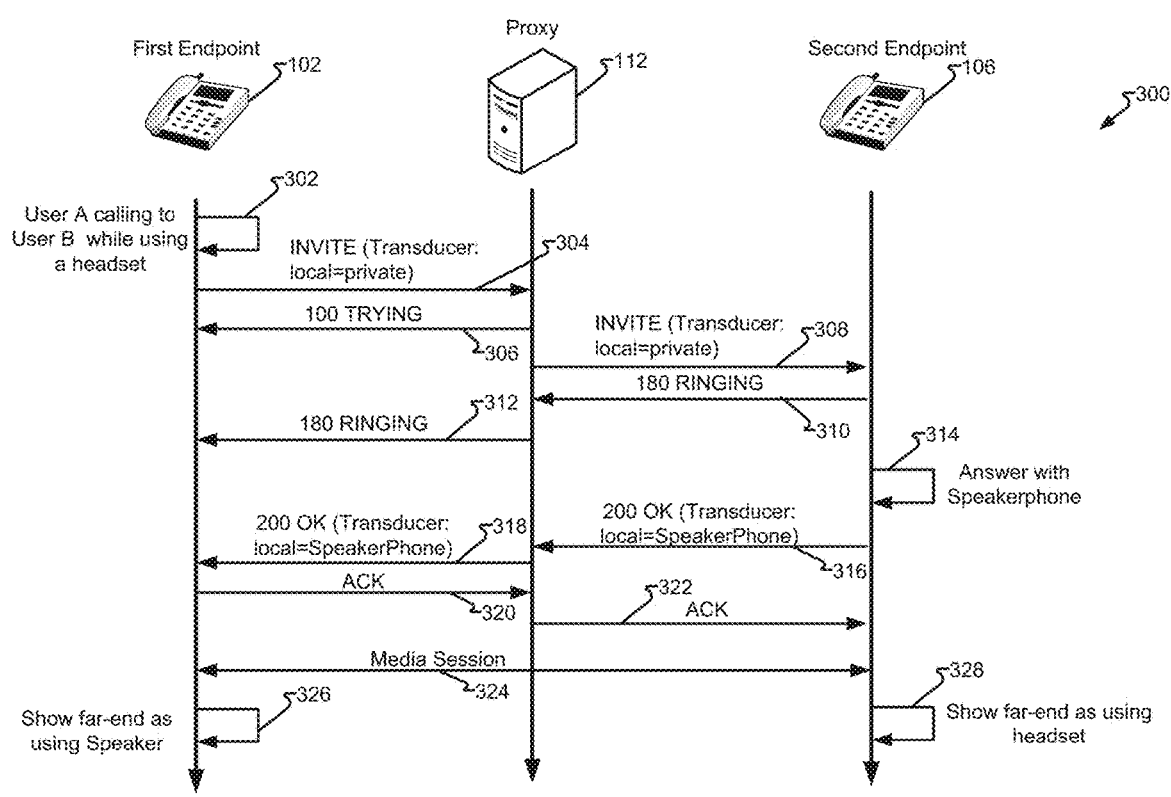
FIGS. 3A-B depict a second interaction in accordance with embodiments of the present disclosure.
Figure 3B:
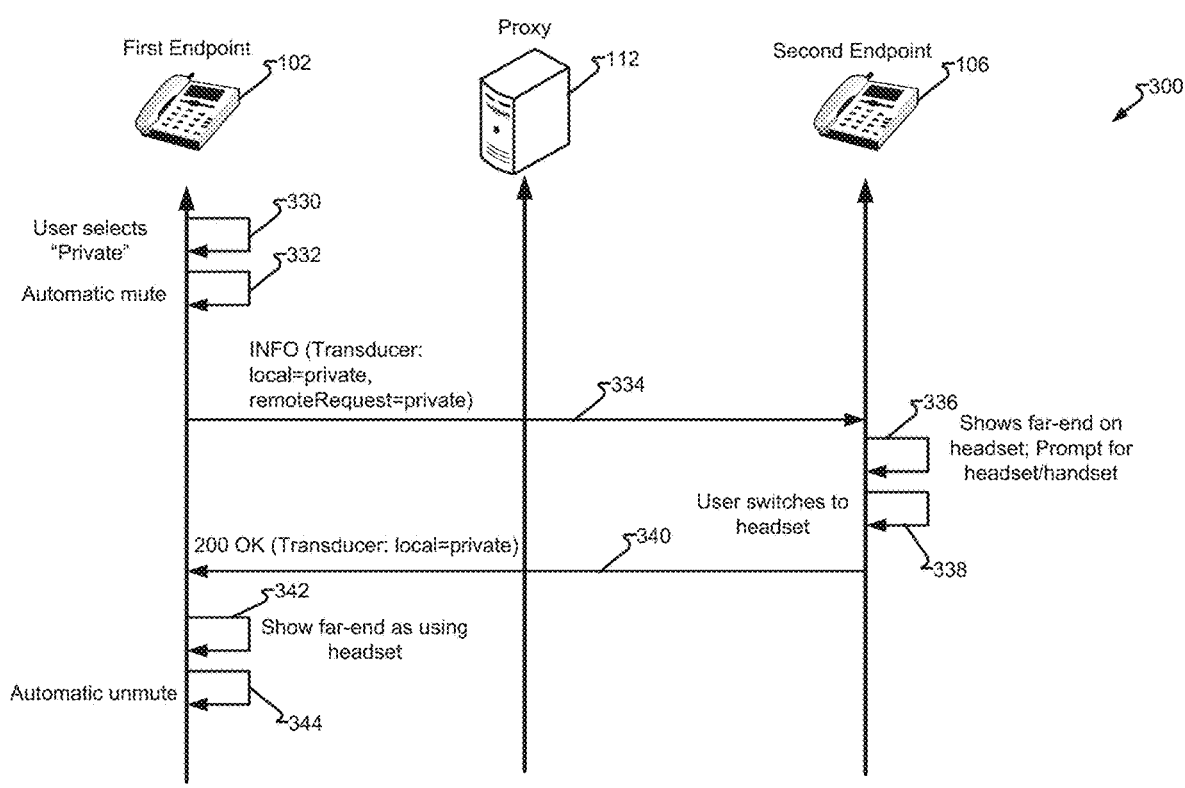

FIGS. 3A-B depict interaction 300 in accordance with embodiments of the present disclosure. In one embodiment, first user 104 utilizes first endpoint 102 to initiate a call to second user 108 utilizing second endpoint 106, such as by taking first endpoint 102 off-hook with a headset in step 302. A processor of first endpoint 102 may detect or receive a signal from a user interface portion (e.g., circuitry associated with use of a particular transducer, such as a headset, or not a transducer associated with a speaker phone). First endpoint 102 then formulates message 304 comprising the state of the current transducer and sends the message to proxy/proxies 112. In response, proxy/proxies 112 replies with message 306 and sends message 308 to second endpoint 106. Second endpoint 106 replies with message 310 and, in turn, proxy/proxies 112 sends message 312.

Second endpoint 106 answers the call in step 314, such as by going off-hook using a speakerphone. Accordingly, second endpoint 106 formats and sends message 316 to proxy/proxies 112 and, in turn, message 318 is sent to first endpoint 102. In reply, first endpoint 102 sends message 320 and, in turn, message 322 is sent to second endpoint 106. Media session 324 is then established between first endpoint 102 and second endpoint 106. In step 326, first endpoint 102 shows the far-end device (second endpoint 106) as utilizing a speakerphone or other transducer not associated with privacy and, in step 328, second endpoint 106 shows the far-end device (first endpoint 102) as using a headset or other transducer associated with privacy.

With the call underway (e.g., media session 324 is ongoing), first user 104 may wish to provide confidential or other sensitive information to second user 108 and, accordingly, selects a private mode in step 330, such as by selecting private mode button 118. In response, in step 332 first endpoint 102 may energize a feature of first endpoint 102 associated with conducting a private conversation with a non-private far-end transducer, such as by muting the audio input of first endpoint 102, playing an audible tone or message by an audio output (not shown) of first endpoint 102, presenting a message or illuminating a light on user interface 114, or a combination thereof to provide indicia of non-privacy.

Next, message 334 is formatted and sent to second endpoint 106 comprising a header and value associated with privacy, such as "Transducer: remoteRequest=private". Alternatively or additionally, a local state of first endpoint 102 may be included, such as "Transducer: local=private," to indicate that first endpoint 102 is using a transducer associated with privacy. In response, second endpoint 106 prompts second user 108 to utilize a headset/handset or other transducer associated with privacy in step 336. Alternatively or additionally, second endpoint 106 shows the far-end device (first endpoint 102) as being in a private mode, such as with the utilization of a headset. While prompting second user 108 to switch to a private-mode transducer may be provided, in other embodiments, an automatic transition is provided. For example, a speakerphone (or audio signal received by the speakerphone for output) may be disabled. Additionally or alternatively, the speakerphone may present an indicia of the state of the speakerphone, such as a recorded or generated tone or message (e.g., "Speaker phone disabled, continue the call with a headset or handset"), illuminate a light, or present a textual message, or a combination thereof to automatically, and without human intervention, transition the speakerphone transducer to a transducer associated with privacy and notify second user 108 of the transition. In response to being prompted or as a result of an automatic transition to private mode, second user 108 discontinues use of the speaker phone and/or initiates use of a headset in step 338.

Next, second endpoint 106 sends message 340 to first endpoint 102 indicating the mode for the local device ("local" being the device from which a message originates) is in private mode or otherwise utilizing a transducer associated with privacy. In response, in step 342, first endpoint 102 indicates the far-end device (second endpoint 106) is now using a headset or other transducer associated with privacy and, in step 344, first endpoint 102 is unmuted and/or other action taken, such as in step 332, discontinued.

Figure 4:
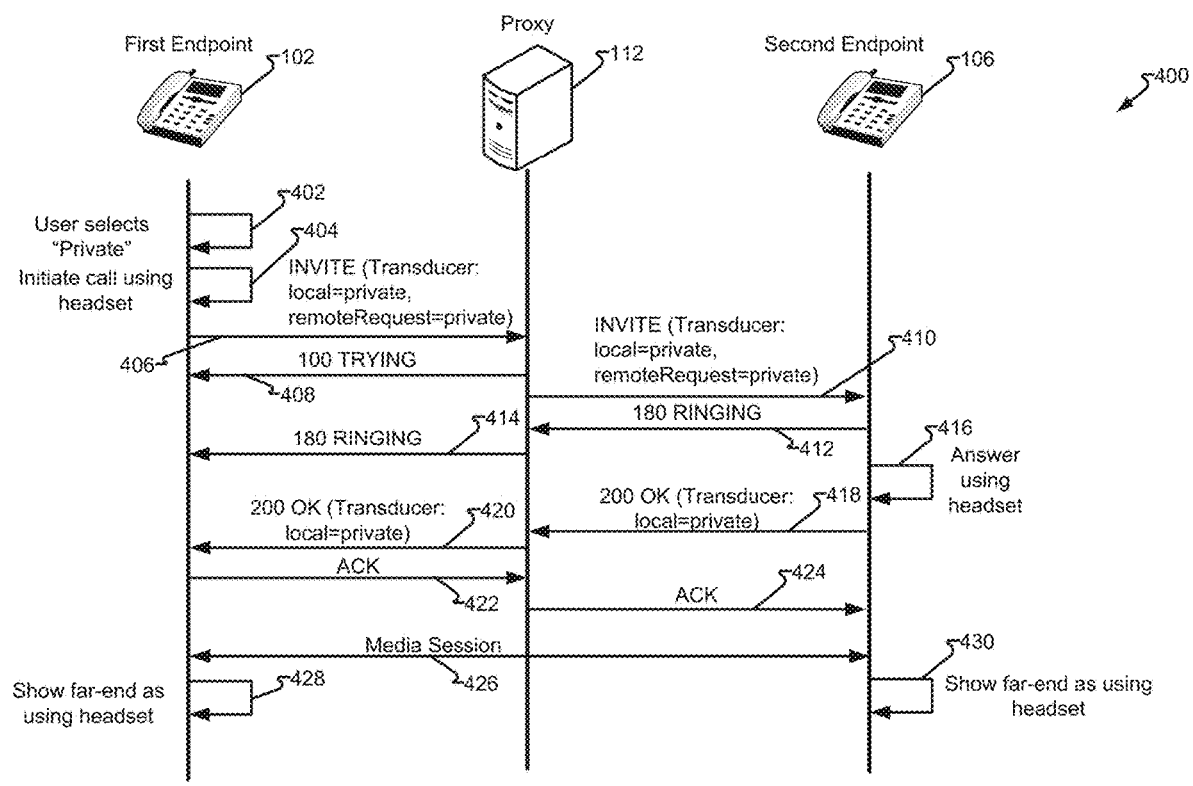
FIG. 4 depicts a third interaction in accordance with embodiments of the present disclosure.

FIG. 4 depicts interaction 400 in accordance with embodiments of the present disclosure. In one embodiment, first user 104 utilizes first endpoint 102 to initiate a call to second endpoint 106 with a privacy mode request and locally using a headset (local privacy mode). Accordingly, step 402 receives an input, such as to call button 116 associated with the number, name, or other indicia of second user 108 and/or second endpoint 106. The call initiation may further require going off-hook with a transducer associated with privacy in step 404.

Next, message 406 is formatted and sent as an INVITE message comprising header with a "Transducer" field and having a value of "private." Alternative phrasing may be utilized without departing from the scope of the embodiments. For example, "transducer" may be "privacy mode" or other identifier associated with privacy. Similarly, other phrasing for the value of the field "private" may be used, such as "privacy," "headset/handset," "no speakerphone," etc. as may be understood by each of first endpoint 102 and second user 108.

Message 406 is received by proxy/proxies 112, which acknowledges with message 408 and sends message 410 to second user 108, which in turn replies with message 412. Receipt of message 412 then triggers message 414 back to first endpoint 102. Second endpoint 106 is then answered in step 416, which then sends message 418 to proxy/proxies 112, and in turn, message 420. Message 418 and message 420 comprise header with a "Transducer" field having a value of the transducer utilized to answer the call in step 214, in this example, "private," indicating that the second endpoint 106 went off-hook with a headset, handset, or other transducer associated with privacy.

Messages 422 and 424 are sent from first endpoint 102 to proxy/proxies 112 and then to second endpoint 106 to acknowledge the 200 OK message, whereby first endpoint 102 and second endpoint 106 are then connected, such as via a real-time protocol to exchange media (e.g., encoded audio signals) in media session 426. First endpoint 102 displays the far-end device (second endpoint 106) as being in a private mode (e.g., headset/handset) in step 428 and second endpoint 106 displays the far-end device (first endpoint 102) as being in a private mode (e.g., headset/handset) in step 430. The call termination may be initiated (not shown), such as by one of first endpoint 102 or second endpoint 106 sending a termination message (e.g., "BYE").

Figure 5A:
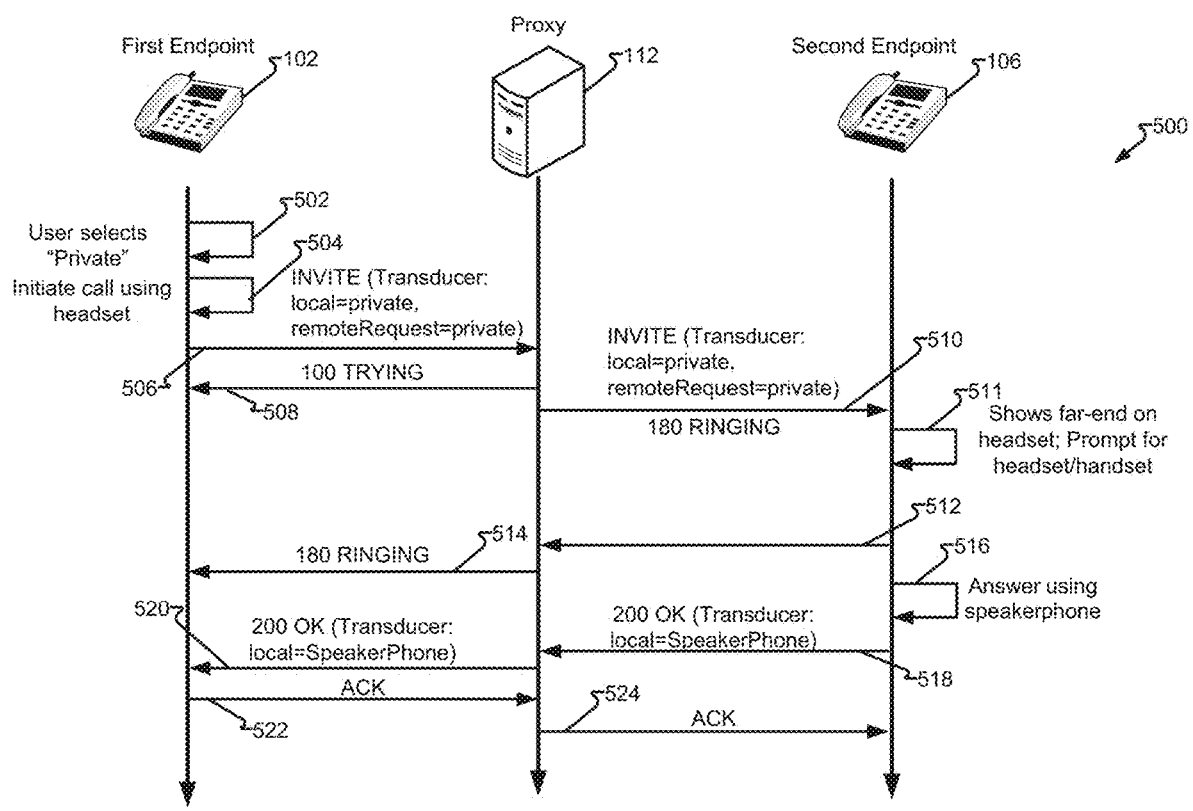
FIGS. 5A-C depict a fourth interaction in accordance with embodiments of the present disclosure.
Figure 5B:
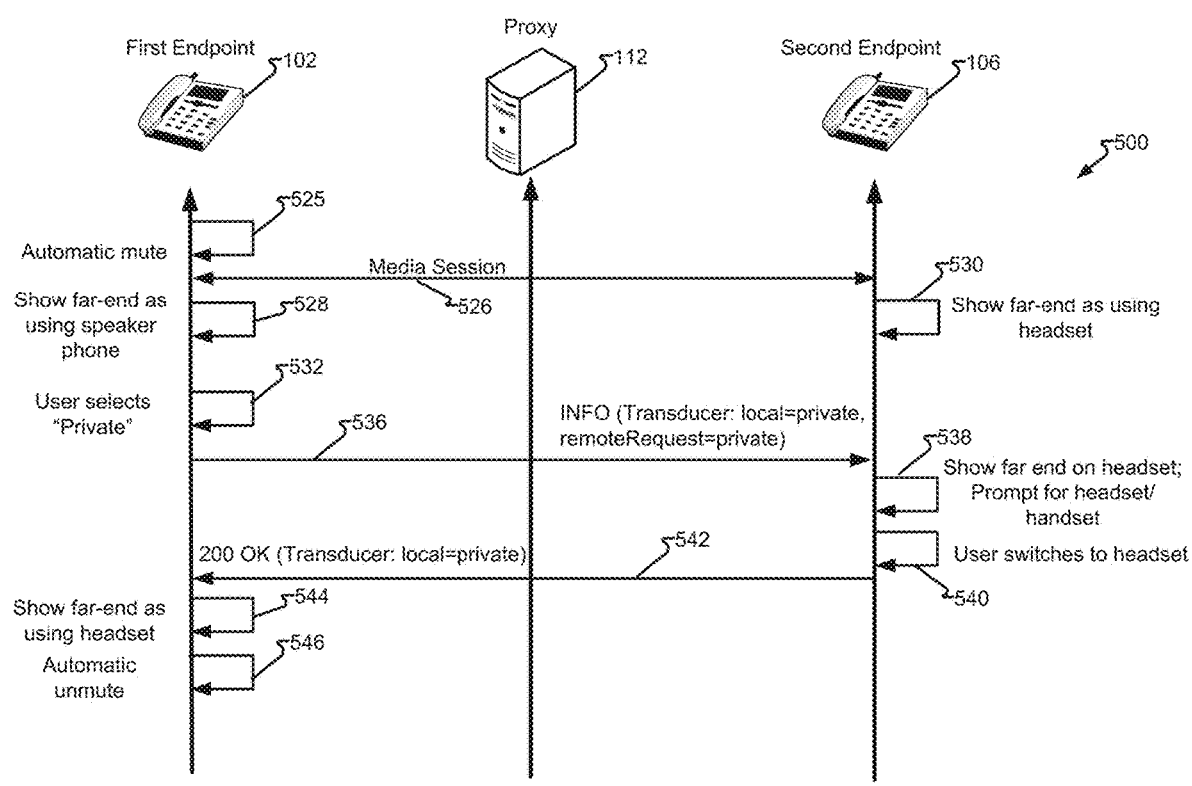
Figure 5C:
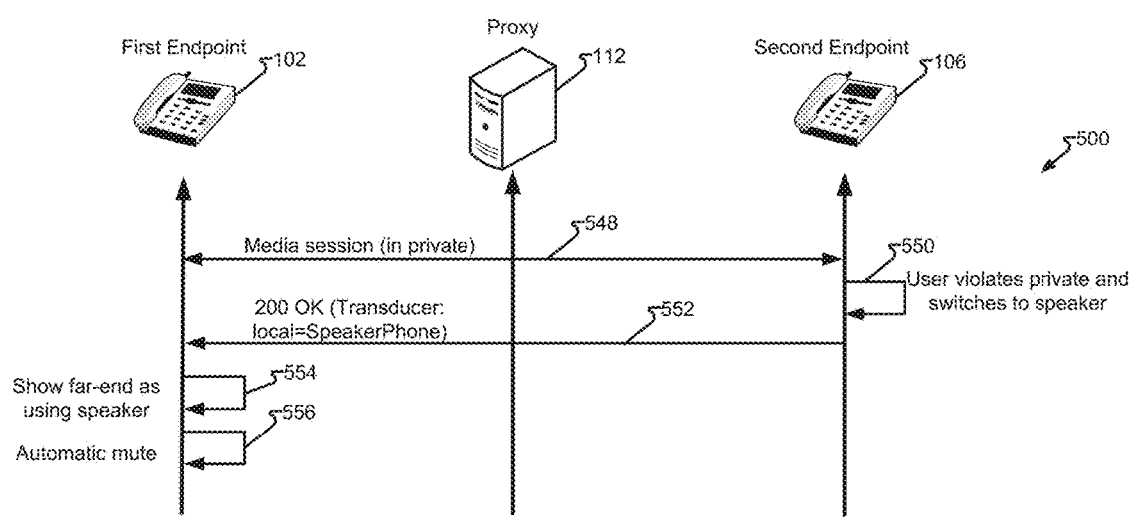

FIGS. 5A-C depict interaction 500 in accordance with embodiments of the present disclosure. In one embodiment, first user 104 utilizes first endpoint 102 to initiate a call to second endpoint 106 with a privacy mode request and locally using a headset (local privacy mode). Accordingly, step 502 receives an input, such as to call button 116 associated with the number, name, or other indicia of second user 108 and/or second endpoint 106. The call initiation may further require going off-hook with a transducer associated with privacy in step 504.

Next, message 506 is formatted and sent as an INVITE message comprising header with a "Transducer" field and having a value of "private." Alternative phrasing may be utilized without departing from the scope of the embodiments. For example, "transducer" may be "privacy mode" or other identifier associated with privacy. Similarly, other phrasing for the value of the field "private" may be used, such as "privacy," "headset/handset," "no speakerphone," etc. as may be understood by each of first endpoint 102 and second user 108.

Message 506 is received by proxy/proxies 112, which acknowledges with message 508 and sends message 510 to second user 108, which in turn replies with message 512. Next, second endpoint 106 shows the far-end (first endpoint 102) as being on headset and prompts for privacy via headset use of second endpoint 106. Receipt of message 512 then triggers message 514 back to first endpoint 102. Second endpoint 106 is then answered in step 516, which then sends message 518 to proxy/proxies 112, and in turn, message 520.

Message 518 and message 520 comprise header with a "Transducer" field having a value of the transducer utilized to answer the call in message 520, in this example, "speakerphone," indicating that the second endpoint 106 went off-hook with a speaker phone or other transducer associated with an absence of privacy.

Messages 522 and 524 are sent from first endpoint 102 to proxy/proxies 112 and then to second endpoint 106 to acknowledge the 200 OK message, whereby first endpoint 102. Prior to media session 526, automatic muting of first endpoint 102 is performed in step 525. Thereafter, second endpoint 106 are then connected, such as via a real-time protocol to exchange media (e.g., encoded audio signals) in media session 526. First endpoint 102 displays the far-end device (second endpoint 106) as being in a non-private mode (e.g., speakerphone) in step 528 and second endpoint 106 displays the far-end device (first endpoint 102) as being in a private mode (e.g., headset/handset) in step 530. At this point, privacy-mode was requested from second user 108 but the call is now underway with second user 108 being in a non-privacy mode.

Continuing from step 530, or in another embodiment, continuing from step 228 (see FIG. 2) wherein the initial request did not include a request for privacy, step 532 occurs upon first endpoint 102 receiving an input from first user 104 indicating privacy mode, such as via an input to private mode button 118. Next message 536 is formatted and sent to second endpoint 106. Message 536 comprising a header with a "Transducer" field and associated "privacy" value, message 536 may also comprise a local state (e.g., "privacy" mode of first endpoint 102).

Next, in step 538, second endpoint 106 presents a prompt to switch to a private mode and optionally the privacy status of the far-end device (first endpoint 102), as described more completely with respect to step 336 (see FIG. 3B). In response, second user 108 switches to a headset from a speaker phone in step 540, which then causes second endpoint 106 to format and send message 542 indicating the local device (second endpoint 106) is in private mode. In response, first endpoint 102 now displays indicia of the status of second endpoint 106 ("private") and, in step 544 and first endpoint 102 is unmuted or other action taken in step 525 terminated, in step 546. Similar to step 332, automatic muting and/or alerting occurs for first endpoint 102 in step 525. Then, in media session 548, the media session initiated in media session 526 continues in private mode for both first endpoint 102 and second endpoint 106.

Subsequently, in step 550, second user 108 may reactivate a transponder not associated with privacy or in violation of a privacy setting, such as by switching audio to utilize a speakerphone. Accordingly, second endpoint 106 formats and sends message 552 having indicia of the now-current state (i.e., "SpeakerPhone"). Accordingly, first endpoint 102 now shows second endpoint 106 as being in non-private/speakerphone mode in step 554 and, in step 556, may automatically mute the audio input of first endpoint 102 or perform one or more other actions as described with respect to step 336 (see FIG. 3B).

In another embodiment, first user 104 may elect to go into a non-private mode to continue the call, such as by issuing a new message (e.g., INFO having indicia of non-privacy, such as a value of "speakerphone" for a Transponder field in the header) or simply terminate the call (e.g., issue a BYE message).

Figure 6:
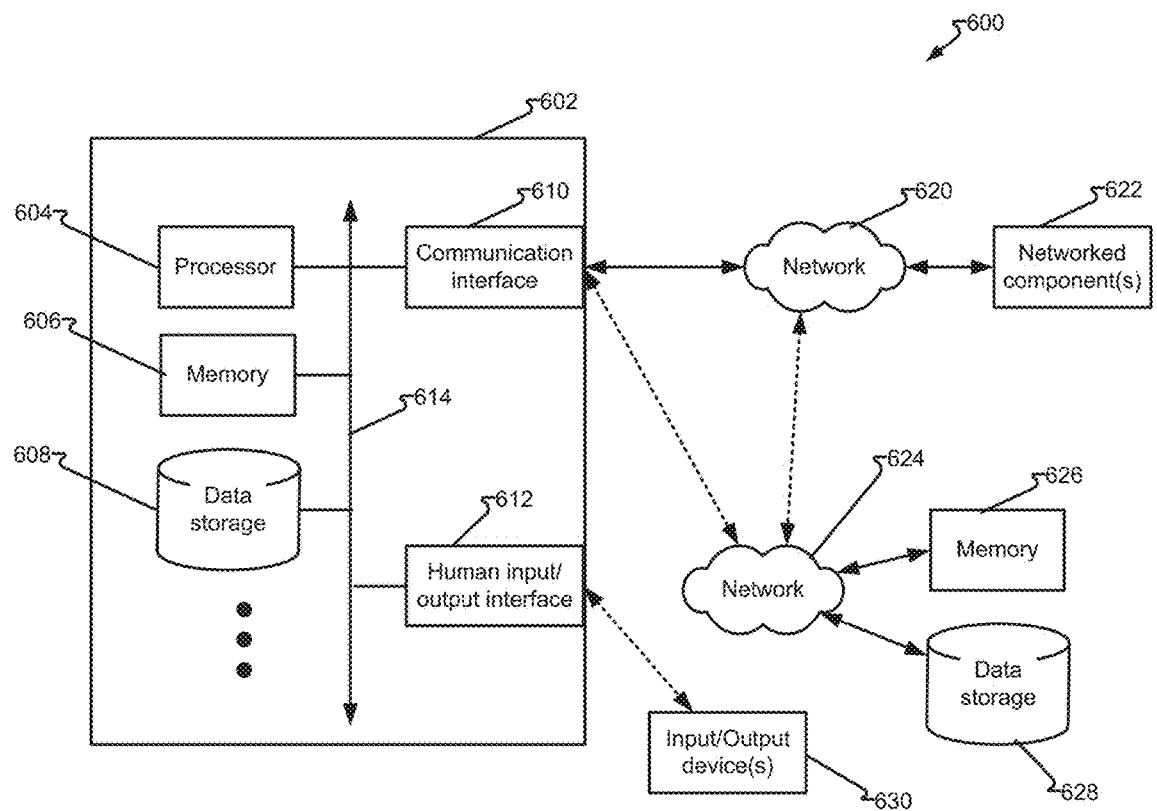
FIG. 6 depicts a second system in accordance with embodiments of the present disclosure.

FIG. 6 depicts device 602 in system 600 in accordance with embodiments of the present disclosure. In one embodiment, one, two, or each of first endpoint 102, second endpoint 106, and proxy/proxies 112 may be embodied, in whole or in part, as device 602 comprising various components and connections to other components and/or systems. The components are variously embodied and may comprise processor 604. Processor 604 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 614, executes instructions, and outputs data, again such as via bus 614.

In addition to the components of processor 604, device 602 may utilize memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, etc. In another embodiment, communication interface 610 may comprise, or be comprised by, human input/output interface 612. Communication interface 610 may be configured to communicate directly with a networked component or utilize one or more networks, such as network 620 and/or network 624.

Network 110 may be embodied, in whole or in part, as network 620. Network 620 may be a wired network (e.g., Ethernet), wireless (e.g., WiFi, Bluetooth, cellular, etc.) network, or combination thereof and enable device 602 to communicate with network component(s) 622.

Additionally or alternatively, one or more other networks may be utilized. For example, network 624 may represent a second network, which may facilitate communication with components utilized by device 602. For example, network 624 may be an internal network to contact center #02 whereby components are trusted (or at least more so) that networked components 622, which may be connected to network 620 comprising a public network (e.g., Internet) that may not be as trusted. Components attached to network 624 may include memory 626, data storage 628, input/output device(s) 630, and/or other components that may be accessible to processor 604. For example, memory 626 and/or data storage 628 may supplement or supplant memory 606 and/or data storage 608 entirely or for a particular task or purpose. For example, memory 626 and/or data storage 628 may be an external data repository (e.g., server farm, array, "cloud," etc.) and allow device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620.

It should be appreciated that computer readable data may be sent, received, stored, processed, and presented by a variety of components. It should also be appreciated that components illustrated may control other components, whether illustrated herein or otherwise. For example, one input/output device 630 may be a router, switch, port, or other communication component such that a particular output of processor 604 enables (or disables) input/output device 630, which may be associated with network 620 and/or network 624, to allow (or disallow) communications between two or more nodes on network 620 and/or network 624. Ones of ordinary skill in the art will appreciate that other communication equipment may be utilized, in addition or as an alternative, to those described herein without departing from the scope of the embodiments.

In another embodiment, first endpoint 102 or second endpoint 106 may initiate or be engaged with another endpoint that is non-responsive to the "Transducer" header in any message. This may be because the other endpoint is a non-SIP device, such as when a SIP call with one of first endpoint 102 or second endpoint 106 is connected to a telephone via an interface with a public switched telephone network (PSTN) and be circuit-switched, with respect to the other interface. Other endpoints may be SIP devices, but not configured to respond to the "Transducer" heading and, as a result, simply ignore such information. Accordingly, first endpoint 102 (or second endpoint 106) on their respective user interface, such as user interface 114 may present information, such as "Privacy Unknown" or other indicia indicating an undetermined privacy. As a further embodiment, such an indicia of an unknown privacy may be presented during portions of a call or call-setup with second endpoint 106 when first endpoint 102 is waiting for a reply (e.g., message 218, message 318, etc.) to arrive at first endpoint 102.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM1926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system for communicating via a network, comprising:
    a processor;
    a communication interface to the network;
    an audio input component; and
    a user interface; and
    wherein the processor performs:
        upon receiving a signal from the user interface associated with placing a call, formatting a Session Initiation Protocol (SIP) INVITE message, wherein the INVITE message comprises a SIP header which further comprises a transducer header field for a far-end device;
        initiating a media session with the far-end device comprising sending, via the communication interface, the INVITE message to the far-end device;
        in response to the sending of the INVITE message, receiving a first reply comprising indicia of a current transducer that is utilized by the far-end device;
        presenting, on the user interface, indicia of the current transducer; and
    upon the first reply comprising the indicia of the current transducer having a value associated with use of a speakerphone, automatically muting the audio input component.

2. The system of claim 1,
    wherein the processor further performs:
        formatting the SIP INVITE message comprising the transducer header field for the far-end device further having a value associated with use of a least one of a headset or handset.

3. The system of claim 1, wherein the processor further performs:
    formatting the SIP INVITE message comprising the transducer header field for the far-end device further having a value associated with use of at least one of a headset or handset; and
    upon the first reply comprising the indicia of the current transducer having a value associated with use of a speakerphone, the processor presents the indicia of the current transducer indicating an absence of privacy.

4. The system of claim 1, further comprising:
    at least one audio input device, wherein one of the at least one audio input device is active; and
    wherein the processor formats the SIP INVITE message further comprising the transducer header field further indicating the active one of the at least one audio input device.

5. The system of claim 1, wherein indicia of the current transducer comprises indicia indicating one of privacy or non-privacy.

6. The system of claim 5, wherein the indicia indicating one of privacy or non-privacy when indicating non-privacy further indicates the far-end device is utilizing a speakerphone.

7. The system of claim 5, wherein the indicia indicating one of privacy or non-privacy when indicating privacy further indicates the far-end-device is utilizing at least one of a headset or a handset.

8. The system of claim 1, wherein the processor further performs:
    conducting a media session with the far-end device;
    while the media session is underway, receiving a second reply comprising an update to the indicia of the current transducer; and presenting, on the user interface, indicia of the updated-current transducer as updated.

9. The system of claim 8, wherein the processor further performs, automatically muting the audio input component, upon determining the indicia of the current transducer, as updated, comprises a value associated with use of a speakerphone.

10. The system of claim 8, wherein the processor further performs, automatically energizing an alerting audio signal presented by the audio output component, upon determining the indicia of the current transducer, as updated, comprises a value associated with use of a speakerphone.

11. The system of claim 1, wherein the processor, in response to the sending of the INVITE message, further performs:
waiting to receive the first reply comprising indicia of the current transducer of the far-end device; and
while waiting, presenting, on the user interface, indicia of an unknown current transducer of the far-end device.

12. A system for communicating via a network, comprising:
a processor;
a communication interface to the network;
an audio input component; and
a user interface; and
wherein the processor performs:
conducting a Session Initiation Protocol media session with a far-end device, via the communication interface;
upon receiving a signal from the user interface associated with placing a call, formatting a Session Initiation Protocol (SIP) INFO message, wherein the INFO message comprises a SIP header which further comprises a transducer header field for the far-end device;
sending the INFO message, via a SIP signaling channel, to the far-end device;
in response to the sending of the INFO message, receiving a first reply comprising indicia of a current transducer that is utilized by the far-end device; and
presenting, on the user interface, indicia of the current transducer; and
upon the first reply comprising indica of the current transducer having a value associated with use of a speakerphone, automatically muting the audio input component.

13. The system of claim 12, wherein the processor, at a time subsequent to receiving the first reply, receives a second reply comprising an update to the indicia of the current transducer associated with a now current transducer utilized by the far-end device.

14. The system of claim 13, wherein the processor further performs:
formatting the SIP INFO message comprising the transducer header field for the far-end device further having a value associated with use of at least one of a headset or handset.

15. The system of claim 13, wherein the processor further performs:
formatting the SIP INFO message comprising the transducer header field for the far-end device further having a value associated with use of at least one of a headset or handset; and upon the second reply comprising indicia of the current transducer having a value, as updated, associated with use of a headset or handset, automatically unmuting the audio input component.

16. A system for communicating via a network, comprising:
a processor;
a communication interface to the network;
a user interface; and
at least one audio input device; and
wherein the processor performs:
receiving, via the communication interface, a Session Initiation Protocol (SIP) INVITE message from a far-end device, wherein the INVITE message comprises a SIP header which further comprises a first transducer header field;
in response to receiving the INVITE message, presenting a call request on the user interface comprising indicia of the first transducer header field;
in response to presenting the call request, receiving an off-hook signal from the user interface, the off-hook signal comprising indicia of a selected one of the at least one audio input device; and
in response to receiving the off-hook signal, formatting a reply message further comprising a second transducer header field indicating the active one of the at least one audio input device;
sending the reply message;
connecting the far-end device for a media session therebetween;
upon connecting the far-end device for the media session, receiving a first SIP INFO message comprising indicia of a request for privacy and, in response thereto, causing the user interface to present a prompt to perform at least one of discontinue use of a speakerphone, utilize a headset, and utilize a handset, and
upon receiving a signal from the user interface indicating discontinuanced of the one of use of the speakerphone, utilization of the headset, and utilization of the handset, formatting a second SIP INFO message comprising indicia of discontinuance of the one of use of the speakerphone, utilization of the headset, and utilization of the handset.

17. The system of claim 16, wherein the reply message comprises a portion of one of a SIP 200 OK message or a SIP INFO message.

18. The system of claim 16, wherein the INVITE message further comprises the SIP header which further comprises the first transducer header field for the far-end device and, in response, the processor causes a call presence with the far-end device to be presented, the presentation of which comprises indicia of the first transducer header field for the far-end device.

19. The system of claim 16, wherein the processor further performs:
conducting a media session with the far-end device;
while the media session is underway, receiving a second reply comprising an updated to a current transducer utilized by the far-end device; and
presenting, on the user interface, indicia of the updated-current transducer as updated.

20. The system of claim 16, wherein upon connecting the far-end device for the media session, receiving the first SIP INFO message comprising indicia of the request for privacy, wherein the indica for the request for privacy is maintained in a third transducer message of the SIP INFO message.

* * * * *

UNITED STATES PATENT AND TRADEMARK OFFICE
CERTIFICATE OF CORRECTION

| | | |
|---|---|---|
| PATENT NO. | : 11,153,353 B1 | Page 1 of 1 |
| APPLICATION NO. | : 16/878369 | |
| DATED | : October 19, 2021 | |
| INVENTOR(S) | : Anand Padhye and Tatya Kadam | |

It is certified that error appears in the above-identified patent and that said Letters Patent is hereby corrected as shown below:

In the Claims

At Column 21, Line 1, please delete "updated-" therein.

At Column 22, Line 42, please delete "discontinuanced" and replace it with --discontinuance-- therein.

At Column 22, Line 65, please delete "updated-" therein.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*